(12) United States Patent
Dusek

(10) Patent No.: US 12,008,016 B2
(45) Date of Patent: Jun. 11, 2024

(54) ACTION ORDERING

(71) Applicant: Onomy LLC, Houston, TX (US)

(72) Inventor: Charles Dusek, Crosby, TX (US)

(73) Assignee: Onomy LLC, Houston, TX (US)

( * ) Notice: Subject to any disclaimer, the term of this patent is extended or adjusted under 35 U.S.C. 154(b) by 205 days.

(21) Appl. No.: 17/564,999

(22) Filed: Dec. 29, 2021

(65) Prior Publication Data

US 2023/0205784 A1 Jun. 29, 2023

(51) Int. Cl.
*G06F 16/23* (2019.01)
*G06F 16/27* (2019.01)

(52) U.S. Cl.
CPC ........ *G06F 16/273* (2019.01); *G06F 16/2365* (2019.01)

(58) Field of Classification Search
CPC .......................... G06F 16/273; G06F 16/2365
USPC ......................................................... 707/615
See application file for complete search history.

(56) References Cited

U.S. PATENT DOCUMENTS

| | | | | |
|---|---|---|---|---|
| 5,555,396 A * | 9/1996 | Alferness | ................ | G06F 9/546 711/147 |
| 7,562,363 B1 * | 7/2009 | Belair | ................... | H04L 51/226 718/102 |
| 7,949,121 B1 * | 5/2011 | Flockhart | ............ | H04M 3/5141 370/352 |
| 9,553,951 B1 * | 1/2017 | Nguyen | ................ | H04L 67/125 |
| 9,904,721 B1 * | 2/2018 | Holenstein | .......... | G06F 11/2097 |
| 10,198,469 B1 * | 2/2019 | Wright | .................. | G06F 16/904 |
| 10,713,589 B1 * | 7/2020 | Zarandioon | ............ | G06N 20/00 |
| 11,197,068 B1 * | 12/2021 | Patricks | .............. | H04N 21/8113 |
| 11,243,979 B1 * | 2/2022 | Mishra | .................. | G06F 16/273 |
| 11,425,252 B1 * | 8/2022 | Martin | ................ | H04M 3/5141 |
| 11,500,701 B1 * | 11/2022 | Onofrei | .................... | G06F 9/546 |
| 2002/0056004 A1 * | 5/2002 | Smith | ..................... | G06Q 40/04 709/227 |
| 2003/0037074 A1 * | 2/2003 | Dwork | ................ | G06F 16/9532 715/229 |
| 2004/0254901 A1 * | 12/2004 | Bonabeau | .............. | G06N 3/126 706/13 |
| 2010/0110083 A1 * | 5/2010 | Paltashev | ............ | G06F 15/7867 345/506 |
| 2011/0246434 A1 * | 10/2011 | Cheenath | ............ | G06F 16/2386 707/703 |
| 2014/0143332 A1 * | 5/2014 | Garg | ................. | G06F 16/24578 709/204 |

(Continued)

*Primary Examiner* — Sherief Badawi
*Assistant Examiner* — Jessica N Le
(74) *Attorney, Agent, or Firm* — Fish & Richardson P.C.

(57) ABSTRACT

Methods, systems, and apparatus, including computer programs encoded on computer-storage media, for action ordering in a multi-agent system such as a distributed system of agent nodes. In some implementations, an exemplary method includes accessing local queues including one or more actions; applying an aggregation function to the local queues; based on the application of the aggregation function, determining an ordering of actions from the actions of each local queue; generating a shared queue based on the ordering of the actions including a first action at a first position of the shared queue and a second action at a second, sequential position of the shared queue; and synchronizing the actions of the distributed system in response to processing the actions of the shared queue according to the ordering of the actions.

18 Claims, 5 Drawing Sheets

(56) References Cited

U.S. PATENT DOCUMENTS

| | | | | |
|---|---|---|---|---|
| 2014/0149575 A1* | 5/2014 | Blackwell | ............... | H04L 43/04 |
| | | | | 709/224 |
| 2016/0085772 A1* | 3/2016 | Vermeulen | .............. | G06F 16/21 |
| | | | | 707/615 |
| 2017/0085488 A1* | 3/2017 | Bhattacharya | ........ | H04L 41/122 |
| 2020/0106718 A1* | 4/2020 | Lesartre | .............. | H04L 47/6275 |
| 2020/0137194 A1* | 4/2020 | McKeown | .............. | H04L 69/40 |
| 2021/0014177 A1* | 1/2021 | Kasichainula | ...... | H04L 47/6295 |
| 2022/0365896 A1* | 11/2022 | Tolchinsky | ......... | G06F 13/4068 |

\* cited by examiner

ACTION ORDERING

TECHNICAL FIELD

The present disclosure generally relates to application of preferential voting in a computing system to order actions.

BACKGROUND

A computing system that orders actions can be a distributed system with multiple agents or individual nodes. Some distributed systems rely on consensus to schedule actions to be taken by a system as well as manage operations between multiple agents. For example, autonomous vehicles or robots may receive or determine movement instructions individually, but often rely on consensus to enable coordinated group movement, such as swarming. In a distributed computing example, transactions to be executed on a decentralized database or a distributed ledger require consensus of individual nodes to ensure consistency of data across nodes.

SUMMARY

In general, innovative aspects of the subject matter described in this specification relate to ordering actions, such as movements for autonomous vehicles or commitments of transactions to a distributed ledger. Multiple agents provide locally generated proposed sequence of actions, here referred to as queues, to one or more processors. The processors receive or obtain the locally generated queues sent over a network from the multiple agents. The processors can pre-process the local queues received from the agents. The processors then aggregate the multiple different orderings of the locally generated queues received from the agents to determine a shared queue with an ordering based on the multiple different orderings. By determining the shared queue ordering based on the multiple different orderings of the locally generated queues, any particular agent is prevented from ordering the actions to produce an unfair advantage or aid bad actors.

The subject matter described in this specification can be implemented in particular embodiments so as to realize one or more of the following advantages. Techniques disclosed in this document leverage action culling as well as aggregation functions to generate a shared queue of actions that generates consensus and preserves order integrity when synchronizing actions, executions, and transactions of distributed or multi-agent systems as well as ensuring consistency of actions taken by systems.

For example, the techniques provide unique, localized applications of preferential voting across agents of a distributed system, also known as compute nodes, to address or solve decentralized ordering problems in a fault prone setting. Relative to prior approaches, this specific use of preferential voting for action ordering provides an improved framework for sequencing transactions among distributed nodes of a network. This framework can allow for efficient and dynamic selection of specific agents for action ordering without the processing overhead of analyzing or averaging action timestamps.

One innovative aspect of the subject matter described in this specification is embodied in a method that includes accessing a plurality of local queues, where each local queue of the plurality of local queues includes one or more actions; applying an aggregation function to the plurality of local queues; based on the application of the aggregation function, determining an ordering of a plurality of actions including the one or more actions of each local queue, where the ordering includes a first action being ordered before a second action; generating a shared queue based on the ordering of the plurality of actions, the shared queue including the first action at a first position of the shared queue and the second action at a second, sequential position of the shared queue; and synchronizing transactions of the distributed system in response to processing the plurality of actions of the shared queue according to the ordering of the plurality of actions.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations actions include transmitting a representation of the shared queue to each of the one or more agents.

In some implementations, the representation of the shared queue includes a hash value and actions include generating the hash value representing the shared queue by applying a hash function to the shared queue.

In some implementations, actions include obtaining a new local queue from a first agent in response to transmitting the representation of the shared queue to the first agent, where the new local queue includes at least one action obtained by the first agent not included in the plurality of actions of the shared queue.

In some implementations, each local queue of the plurality of local queues is generated by one or more agents of the distributed system and actions include, for each of the one or more agents, obtaining a local queue generated by the agent based on an ordering of the one or more actions obtained by the agent.

In some implementations, actions include applying a culling function to the plurality of local queues before applying the aggregation function.

In some implementations, applying the culling function includes obtaining a first action sequence from a first local queue of a first agent; obtaining a second action sequence from a second local queue of a second agent; identifying at least one action included in one of the first action sequence and the second action sequence but not included in both the first action sequence and the second action sequence; and removing the at least one action from one of the first action sequence and the second action sequence.

In some implementations, the aggregation function represents a preferential vote that sequences a respective plurality of actions that are received by each of one or more agents each generating a local queue of the plurality of local queues.

In some implementations, synchronizing transactions of the distributed system includes computing a latency value that measures delay in traversing a distance between two or more agents of the distributed system; and determining a topology of transactions at the distributed system based on: i) action sequences that are generated at the respective local queue of each agent, and ii) the latency value.

In some implementations, actions include generating an aggregate queue from the determined topology of transactions, the aggregate queue including a final ordering of the plurality of actions; and ordering transactions of the distributed system in a Directed Acyclic Graph (DAG) based on the final ordering of the aggregate queue.

In some implementations, the distributed system is an asynchronous system including a plurality of asynchronous computing nodes; and a subset of the plurality of actions occur asynchronously at computing nodes of the distributed system.

In some implementations, applying the aggregation function includes ordering the plurality of actions according to Borda count rules.

In some implementations, applying the aggregation function includes performing Kemeny median approximations.

In some implementations, determining the ordering of the plurality of actions includes determining the ordering of the plurality of actions without reference to a timestamp associated with any of the plurality of actions.

In some implementations, each of the one or more agents are located at different geographic locations.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of these installed on the system that in operation causes the system to perform the actions. One or more computer programs can be so configured by virtue of having instructions that, when executed by a data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
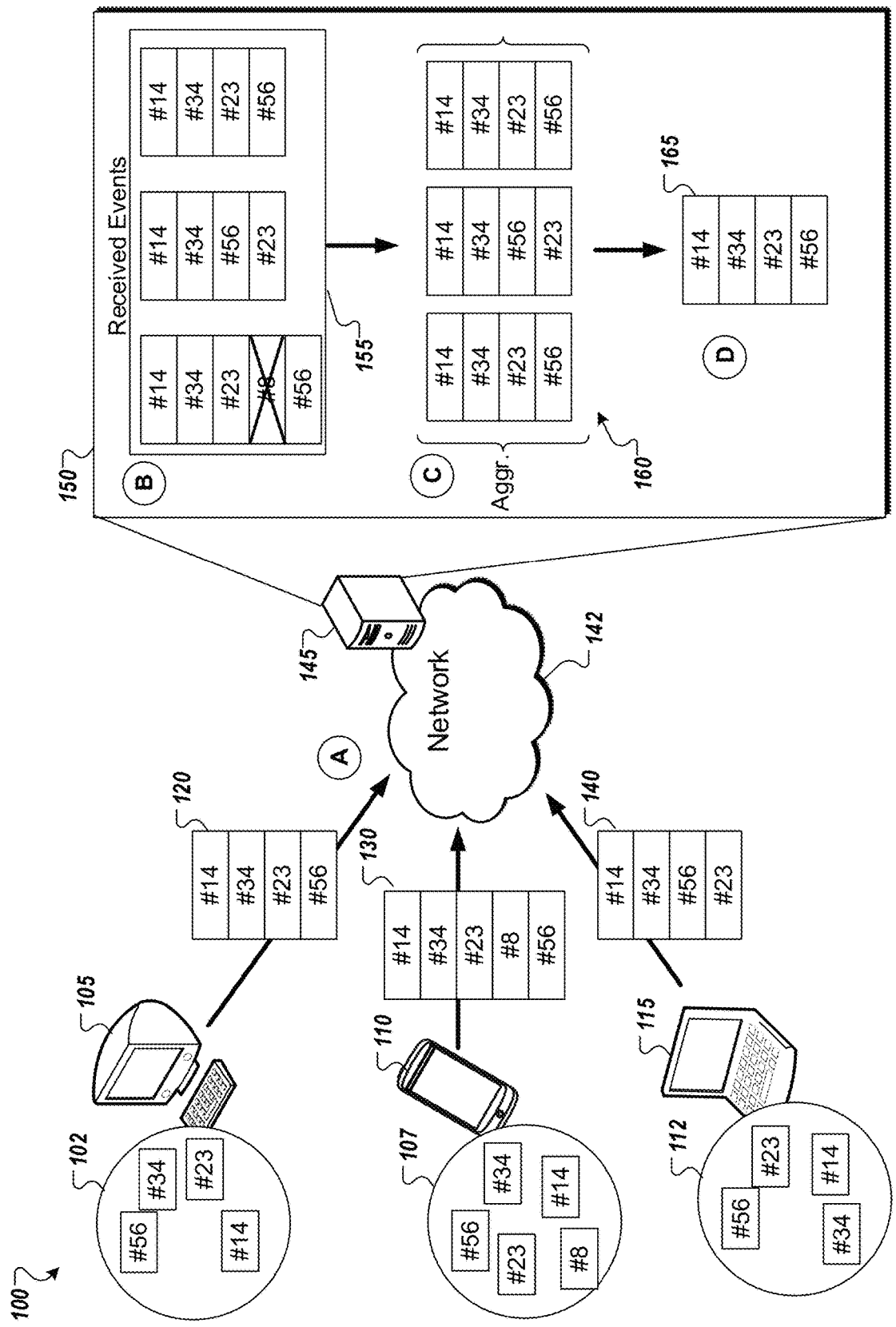
FIG. 1 is a diagram showing an example of a system for action ordering.

FIG. 1 is a diagram showing an example of a system 100 for action ordering. The system 100 includes multiple agents, such as a desktop computer 105 ("computer 105"), a smartphone 110, and a laptop 115. In general, any electronic device may be used as an agent within the system 100 including one or more servers. The system 100 further includes control unit 145 communicably connected to the agents 105, 110, and 115 through network 142. The network 142 may be any communication infrastructure that supports or enables electronic/digital exchange of data between two or more agents. The network 142 can include portions or segments that are geographically dispersed. In some examples, the network 142 is a combination of wireless or wired networks and includes a local area network (LAN), a wide area network (WAN), the Internet, or other network topology.

The control unit 145 includes one or more processing elements as discussed herein to process actions obtained from the agents 105, 110, and 115. For example, a processing element of control unit 145 can include one or more processors, a chipset, a memory system, or other computing hardware for executing specific computational rules. In some implementations, the control unit 145 (or its processing element(s)) includes application-specific hardware, such as an application-specific integrated circuit (ASIC), a field-programmable gate array (FPGA), a graphics processing unit (GPU) or other embedded, dedicated hardware. The control unit 145 also includes special-purpose software, which configures the unit to perform some (or all) of the functions described in this disclosure.

In some implementations, the processing element(s) of control unit 145 provide a culling and aggregation engine as a sub-system of hardware circuits (e.g., special-purpose circuitry). Each of the culling engine and the aggregation engine is described in more detail below. The special-purpose circuitry is operable to execute specific compute logic/rules, for example, to process and synchronize a set of actions. The processing and synchronization may be accomplished using specific data processing functions that are applied to the set. The functions can include a culling function, an aggregation function, or both.

In stage A, the agents 105, 110, and 115 provide locally generated queues to the control unit 145. Each agent can obtain one or more transactions that are then included in queues to be sent to the control unit 145. For example, the computer 105 obtains a set of transactions 102 received from one or more users of the system 100. Each transaction within the set of transactions 102 are received at the computer 105 at a specific time. In general, transactions may be received by agents 105, 110, and 115 at different times or in different orders. The differences in time or order of transactions received by devices may depend, in part, on the differences in network latency or geographic distances separating a user transmitting a given transaction and the computer 105. The difference in orderings or times may also depend on the hardware of the computer 105 and a sending user. In general, discussion with respect to the computer 105 can be applied to the other agents including the smartphone 110 and the laptop 115.

In some implementations, a queue occupies memory space within a computer readable storage medium. In some cases, bits of memory within a storage medium communicably connected to an agent can be allocated for storing local queues. For example, the smartphone 110 can be communicably connected to a storage medium. The storage medium can include one or more bits allocated to store the queue 130. Each of the agents can similarly store queues using a connected memory location. In some cases, memory locations are remote to the agent. For example, an agent can interface with a storage medium through a network in order to store and retrieve data on the storage medium including storing and retrieving transactions stored within queues.

In some implementations, a command provided to one or more agents of a multi-agent system specifies adjustments to one or more addresses corresponding to resources or locations. The addresses can include shared memory addresses within a computer-readable medium in a distributed or decentralized system as well as physical locations occupied by real-world agents, or addresses of agents themselves, such as autonomous drones. For example, a command can include an adjustment to a first address corresponding to a first user account and an adjustment corresponding to a second address corresponding to a second user account. A command for blockchain based funds, also referred to as a transaction herein, may include adjusting the first user account balance by subtracting one bitcoin and adjusting the second account balance by adding one bitcoin. Each agent 105, 110, and 115 can include memory locations corresponding to one or more user accounts.

When an agent receives commands or transactions from a user, such as one or more of the transactions in the sets of transactions 102, 107, and 112, the agent can assign a corresponding unique identifier. The agent can parse the transaction to determine one or more memory addresses affected by the transaction. Addresses affected by the transaction can be adjusted based on the properties of the transaction. Addresses specified for a given transaction can be accessed or affected in accordance with the command. For example, a command may dictate an action be performed against an address, which affects the address by causing a corresponding change in state at the address. As described in detail below, the system 100 can also disaggregate commands into a number of different affected address action paths. Each agent can generate a local queue for each shared memory address. In some cases, each shared memory address can correspond to a user account. After parsing a received command (or transaction), an agent can assign the unique identifier for the transaction to each local queue corresponding to each memory address affected by the transaction.

In the example of FIG. 1, the agents 105, 110, and 115 all generate local queues 120, 130, and 140 corresponding to a particular shared memory address. That is, each of the transactions #14, #34, #23, #56, and #8, that are included in one or more of the local queues 120, 130, and 140, affect the particular shared memory address. As discussed herein, the shared memory address can be associated with a single user account and be used to track the status or funds available to the user. In some implementations, each shared address in a set of shared addresses corresponds to a respective core on a GPU.

In the example of FIG. 1, each of the agents 105, 110, and 115 together with the control unit 145 generate the shared queue 165. The shared queue 165 indicates the shared queue for the particular memory address associated with each of the local queues 120, 130, and 140. The control unit 145, or other agent in embodiments where one or more agents operate as a control unit, sends data indicating the shared queue 165 to each of the agents 105, 110, and 115.

Although FIG. 1 shows the generation of a single shared queue, shared queue 165, for a single memory address, the process may be performed for multiple different memory addresses. For example, the transaction #14 may affect a first address corresponding to the local queue 120 as well as a second address. The agents 105, 110, and 115 can each generate a local queue that records all transactions that affect the second address. In the same manner as the local queues for the first address, the agents 105, 110, and 115 can provide the local queues for the second address to the control unit 145 or specified agent or agents acting as a control unit. The control unit can generate the shared local queue for the second address and send data corresponding to this shared local queue back to the agents 105, 110, and 115.

After receiving at least one shared local queue, a given agent, such as the agent 105, can process the shared queues to determine if there are conflicts. In one example, the computer 105 can receive data corresponding to the shared local queue 165. The computer 105 can parse transaction #14 to determine what addresses are affected. If the transaction #14 affects a first address, represented by the local queues 120, 130, and 140, and a second address, the computer 105 can check if a shared queue has been received corresponding to the second memory address. If not, the computer 105 locks the shared queue 165.

When a shared queue for the second memory address is received, the computer 105 can aggregate the shared queue 165 corresponding to the first memory address and the shared queue corresponding to the second memory address. In some cases, the computer 105 can run an aggregation operation similar to the aggregation 160. In some cases, the computer 105 runs a Borda count, lexicographical sort, or preferential voting method on the multiple shared queues to determine a final ordering of the transactions. The one or more ordered transactions output by the aggregation are performed by the computer 105 to update the various memory addresses based on the transactions in the multiple shared queues.

Each agent can individually and asynchronously process multiple shared queues to resolve conflicts and then adjust memory address locations according to the final ordering of transactions. Each agent can run, in parallel, any set of transactions that involved distinct memory address locations. That is, if one or more queues of transactions affect a first and second memory address and one or more queues affect a third and fourth memory address, an agent can perform the corresponding transactions affecting the first and second memory addresses on a first processor and the transactions affecting the third and fourth memory addresses on a second processor. If the agent includes multiple processing cores, the transactions may be performed in parallel. Moreover, each agent can process transactions affecting the same memory addresses asynchronously. In this way, the system 100 can not only improve efficiency over traditional distributed systems by performing transactions asynchronously across multiple agents, but also by processing, in parallel, disaggregated transactions that do not share memory addresses.

The agents 105, 110, and 115 generate local queues 120, 130, and 140, respectively from the sets 102, 107, and 112. For example, computer 105 generates the local queue 120 based on the set of transactions 102. In some implementations, the computer 105 generates the local queue based on a time corresponding to each transaction of the set of transactions 102, such as a time of receipt. The computer 105 can order the transactions 102 such that a transaction with a time receipt before another transaction is placed before the other transaction.

The computer 105 can also order the set of transactions 102 without reference to a time of receipt. In some cases, the computer 105 can place transactions in the local queue 120 as they are received such that a transaction received at a first time is placed in the local queue 120. At a second time subsequent to the first time, a second transaction can be placed in the local queue 120 behind the first transaction. Received transactions can be placed until the local queue 120 is fully generated.

In some implementations, the agents 105, 110, and 115 generate local queues 120, 130, and 140 based on internal logic or features of the corresponding transactions. For example, the smartphone 110 can determine that action #8, a transaction, should be initiated before action #56. In general, the smartphone 110, or a user of the smartphone 110, can order the set of transactions 107 in the queue 130 in any order.

In the example of FIG. 1, each action can represent or form a given transaction. In an example where the system 100 is implemented as a distributed ledger, a transaction can include identifiers corresponding to one or more updates to the ledger or database. In some cases, the identifiers include blockchain account identifiers corresponding to one or more parties to a transaction. In some cases, each of the transactions 56, 34, 23, 14 are sent by users of a particular blockchain ledger system. In some other cases, each of the transactions 56, 34, 23, 14 are transactions that are sent by users of different blockchain ledger systems.

The control unit 145 receives or obtains the local queues 120, 130, and 140 from agents 105, 110, and 115 of the system. In some cases, each of the agents 105, 110, and 115 are nodes within a distributed ledger system. As discussed, the agents 105, 110, and 115 can send the local queues 120, 130, and 140 over the network 142 to the control unit 145. As indicated above, for these and other operations the network 142 can be any form of communicable network including network forms that incorporate both wired connections and wireless connections.

In some implementations, the control unit 145 is an agent within the system 100. For example, the control unit 145 can obtain its own set of transactions or can be designated as a control unit based on computational resources, geographic location (e.g., centrally located relative to one or more other agents within the system 100), or other system criteria. In some examples, the control unit 145 is an agent that is designated as a control unit, where the designation may be commanded by a higher-level controller of the system 100. The agent designated as the control unit for aggregation of local queues can be periodically or dynamically changed, for example by the higher-level controller or by consensus of the agents, to prevent any one agent from controlling the ordering of transactions. In some cases, when a time duration, indicating an amount of time since a control unit change, satisfies a time threshold, the higher-level controller of the agents can designate a new control unit or multiple control units. By consolidating processes, duplicate processes from all or a plurality of agents performing the same processes can be reduced thereby increasing efficiency and saving network bandwidth.

In some implementations, one or more of the agents 105, 110, and 115 perform operations of the control unit 145. In some cases, all agents within the system 100 perform the operations of the control unit 145. Multiple agents operating as a control unit can provide redundancy, can increase the integrity of the system 100, and can help prevent nefarious actors from engaging in fraudulent or dishonest actions. Agents 105, 110, and 115 can compare the output from performing operations of a control unit to determine if there has been a fault within the system 100.

In some implementations, control units are decided upon by a preferential vote. The agents submit a preferential vote consisting of a ranking of candidate control units to the current control units. Once some or all of the preferential votes are received by the control units, a Borda Count, lexicographical sort or preferential voting method is executed by the current control units on the received votes to determine an agreed upon shared ranking of candidate control units. In some cases, ranking of candidate control units is based on latency or processing power for each of the corresponding candidate control units. The top N ranked candidates will be accepted as new control units where N is less than the number of candidate control units. In this way, the system 100 may achieve consensus on how to adapt to changing conditions to maintain higher service levels.

In some implementations, the designated control unit does not provide a locally generated queue. For example, if an agent is designated as a control unit, such as the control unit 145, it only aggregates the local queues obtained from the other agents of the system 100. In this way, the system 100 can prevent conflicting interests when an agent is ordering its own transactions relative to other obtained transactions.

In stage B, the processor unit 145 performs a culling operation 155. The culling operation includes obtaining local queues of the system 100, including the queues 120, 130, and 140. The culling operation includes removing one or more actions from the local queues 120, 130, and 140, based on the contents of the local queues 120, 130, and 140.

In some implementations, the culling operation 155 includes performing an intersection or set intersection operation. For example, the control unit 145 can obtain the local queues 120, 130, and 140. For each action in a first queue of the local queues, the control unit 145 can determine if the action is included within the other queues. If the action is not included within one or more queues, then the control unit 145 can remove the action. In some cases, removed actions can be added to a separate data structure to track actions that have been removed.

In some implementations, the culling operation 155 includes a byzantine fault tolerant ratio. For example, the culling operation 155 may only require that a certain byzantine fault tolerant ratio of the local queues received by the control unit have a particular action. If more than a specified ratio, such as ⅓*(number of nodes)+1, ½, or ⅔, of the local queues have a particular action in the queue, then this action will be accepted and back propagated to those nodes that did not report the action. This manner of culling may be particularly useful where Byzantine Fault Tolerance is required such as distributed ledger technology or when safety of humans or human passengers is critical.

In the example of FIG. 1, the control unit 145 identifies action #14 in the local queue 130. In some cases, the control unit 145 identifies action #14 in the shortest obtained queue and then identifies the action in the other queues. In this way, the control unit 145 can more efficiently determine the actions common to all obtained queues. The control unit 145 checks the other queues for the action #14. The control unit 145 determines that each of the other queues also includes the action #14. In this case, the action #14 is not removed.

The control unit 145 identifies action #34, #23, and #56 in all of the queues. Action #8 is only in one of the queues. Action #8 is not included in the local queues 120 and 140. The control unit 145 removes action #8 from the local queue 130 and provides the culled queues for aggregation 160.

In stage C, the control unit 145 aggregates the rankings indicated by each of the culled queues obtained from the culling operation 155. Each of the culled queues include actions in different orders. All queues, in the example of FIG. 1, include action #14 prior to action #34 but there is a conflict in ordering for actions #23 and #56. In some implementations, the aggregation operation 160 assigns point values to each of the actions in the culled queues based on a respective ranking of the action in each queue. For example, action #14, in the first position, can be assigned 3 points, whereas action #34, in the second position, can be assigned 2 points, and so forth. In general, any amount of points can be assigned to each ranking.

The control unit 145 combines the scores for each action based on its ranking in each of the culled local queues to determine a shared queue 165 indicating a single ordering of actions based on the ordering of actions in each of the culled local queues 120, 130, and 140. In some implementations, the shared queue 165 can be added to a block in a blockchain ledger. For example, the control unit 145 can generate a block and, after aggregating the local queues obtained from the agents 120, 130, and 140, write the shared queue 165 into the block recording the actions and included transactions.

In a blockchain scenario, the system 100 can be used to achieve consensus while preventing front running attacks where a node with leader or mining privileges is able to order transactions in a blockchain in a way that benefits the leader or mining node or places a new transaction based on pending transactions to earn a profit. Within state of the art consensus used within other blockchain apparatus, it is possible for a leader node or miner to insert transactions before and after large value transactions essentially executing what would constitute "insider trading" operations. By aggregating ranks of the local queues obtained from each agent, the system 100 ensures that a node with leader or mining privileges, such as the control unit 145 is not able to manipulate the transaction orders to gain an advantage, such as the described "insider trading" operations.

Figure 3:
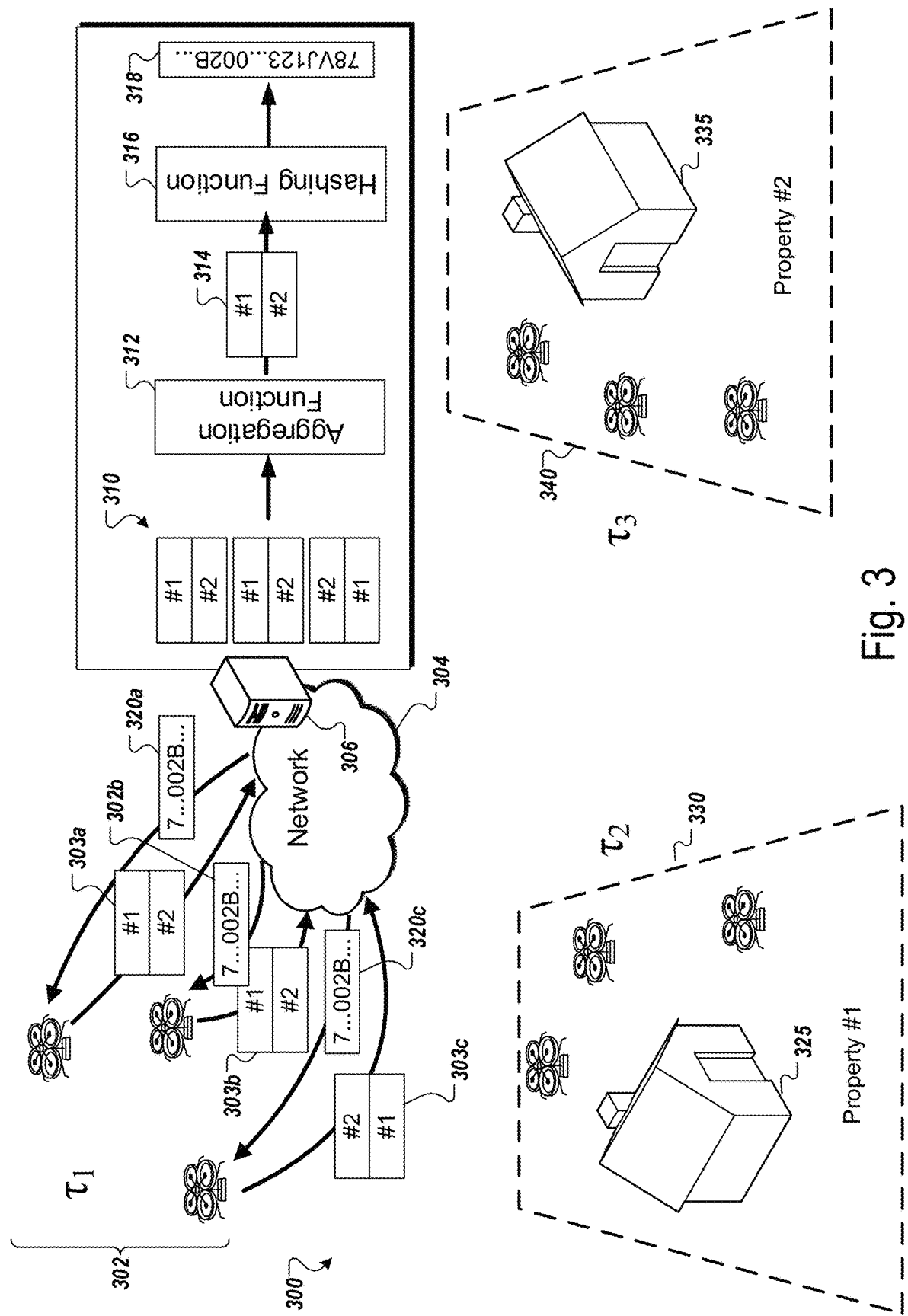
FIG. 3 is a diagram showing an example of a system for ordering actions for autonomous vehicles.

After generating the shared queue 165, the control unit 145 can hash the shared queue 165, as described herein with respect to FIG. 3, and provide a hash(s) of the shared queue 165 or members within the shared queue 165 to each of the agents 105, 110, and 115. In some implementations, the agents 105, 110, and 115 determine, based on the hash(s) of the shared queue 165, what actions were included in the shared queue 165 and what actions were removed. Based on the hash(s) of the shared queue 165, the agents 105, 110, and 115 can resend any transactions in a later generated local queue that can include new received transactions to the control unit 145 or newly designated control unit. The process can continue with the control unit 145 or newly designated control unit processing the newly received transactions and any removed transactions.

In some implementations, the control unit 145 returns local queues or hashes of one or more local queues to the agents 105, 110, and 115. For example, especially where there is redundancy, the control unit 145 returns the pre-culled local queues or one or more hashes of the local queues to the agents 105, 110, and 115 along with the aggregate shared queue 165 generated by the aggregation 160. The agents can then cross-reference the returned local queues or hashes to determine if there are any dishonest or faulty agents or processors. Cross referencing can include a Byzantine filter confirmed by a specified ratio, such as ⅓* (number of nodes)+1, ½ or ⅔ of agents or processors. If any agent or processor is found to be dishonest or faulty then remedial action is taken to secure system 100. Remedial action can include monetary slashing in Proof of Stake, removal from a distributed system or even disablement or destruction of the agent including destruction of any corresponding drone, robot, exo-skeleton, implanted, manipulated, vessel or vehicle.

In some implementations, the agents 105, 110, and 115 include processors that enable hashing operations. The agents 105, 110, and 115 can obtain a hashing function used by the control unit 145 or a key to a generic hashing function corresponding to the control unit 145, the system 100, or the agents 105, 110, and 115. The agents 105, 110, and 115 can decrypt the hash of the shared queue 165 to determine what actions were included in the shared queue and what actions were removed.

In some implementations, the control unit 145 identifies the shortest obtained local queue. For example, the control unit 145 can determine the shortest local queue or, if there is a tie for shortest queue, a queue with a queue size equivalent to the shortest queue size. In the example of FIG. 1, the local queue 120 and 140 both include one less action than the local queue 130. The local queue 120 and 140 are the same size in that they include the same number of actions. The control unit 145 can choose from the local queue 120 and 140.

In some implementations, the control unit 145 prioritizes local queues that arrive first. For example, as shown in FIG. 1, the local queues 120 and 140 are of the same size. The control unit 145 can identify initial actions, for subsequent determination in the other queues, in the queue that was obtained first. In some cases, the control unit 145 maintains a current shortest local queue. If a queue is obtained that is shorter than the current shortest local queue, the control unit 145 can update the current shortest local queue. When the culling operation is performed, the control unit 145 can use the shortest local queue to identify all actions common to all queues as discussed herein.

In some implementations, the control unit 145 synchronizes transactions indicated by actions of the local queues 120, 130, and 140. For example, the control unit 145 can write the generated shared queue 165 to a blockchain ledger executing each transaction of the shared queue 165.

In some implementations, synchronizing transactions of a distributed system includes computing a latency value. For example, the control unit 145 can generate a latency value that measures delays in traversing a distance between two or more agents of the distributed system. For example, the agents 105, 110, and 115 exist in space a certain distance from one another. Data traveling in the network 142 connecting the agents takes time to cover the distances. Data may be traveling as electrical signals within wires or in radio frequencies transmitted from antennas of an agent or other device associated with the network 142.

The control unit 145 can determine a topology of transactions at the distributed system. For example, the control unit 145 can determine a topology based on action sequences that are generated at the respective local queue of each agent, such as the local queues 120, 130, and 140 and a generated latency value indicating delays within the distributed system.

In some implementations, a data model trained from topology and latency values is used to determine a shared queue. For example, the control unit 145 can provide training data with known or curated topology and latency values to a machine-learning model. The training data can include topology and action sequences associated with a known distribution of agents. During a training phase, the model is trained by iteratively processing the training data to improve upon an accuracy of predictions generated by the model. During an implementation phase, after training and adjusting the weights and parameters of the model, the control unit 145 can provide new topology and action data to the trained model to compute a prediction output. The model can then provide an output indicating a likely or predicted ordering of actions based on the topology and generated latency values.

For example, local queues can include conflicting actions, such as the action #56 being ordered before action #23. If the agents are ordering the local queues based on time of receipt of the actions, the difference in order of actions may be due to differences in distance between the two agents and a third agent or user that transmitted the action. If the transmitter is closer to a first agent than a second agent and both the agents order actions based on time of arrival, the first agent can order actions from the transmitter before the second agent due to the difference in time it takes the data from the transmitter to reach the second agent. By determining the relevant latency and topology of multiple agents, a system, such as the system 100, can determine the ordering of actions in spite of action conflicts due to transmission latency.

In some implementations, the control unit 145 performs transmission latency adjustment. For example, the control unit 145 can process queues from agents that order actions based on time of arrival with an additional latency adjustment operation. The latency adjustment operation can determine, based on multiple queues from these agents that order actions based on time of arrival, where the actions should be ordered based on a set standard time. For example, if a transmitter of an action transmitted the action at a first time, the control unit 145 can use the first time, determined based on latency values and topology, to order the action.

Because there is only one time corresponding to when an action was transmitted but multiple times indicating when the action may be received by multiple agents, ordering the actions based on time of transmission can alleviate ordering issues caused by transmission latency.

In some implementations, a trained model determines latency values of actions based on order of actions over time. For example, the control unit 145 can provide the model with local queues from a first agent and a second agent. If the first agent consistently switches the order of actions compared to the second agent within their local queues, the model may output results indicating that a transmitter of the actions is separated by more or less distance from the first agent than the second agent.

Each of the actions can include information indicating a transmitter. In some implementations, the action is a data structure that includes an identifier portion and an action payload portion. For example, the data structure can be a sequence of two or more bytes, where at least one byte of the sequence is an identifier portion that uniquely identifies the transmitter, and one or more of the remaining bytes is an action payload portion that provides information specific to the action.

The transmitter can include a device or user that transmitted the action to the system 100. The actions can include identifying information, e.g., the identifier, which can be parsed by the control unit 145 or related processes to determine the relationship between the ordering of local queues and a likely distance between agents or transmitters within the system 100. In some cases, each transmitter is an agent within the system 100.

In some implementations, synchronizing transactions includes further operations. For example, the control unit 145 can generate an aggregate queue from a determined topology of transactions. The aggregate queue can include a final ordering of the actions. The system 100 can determine an ordering of transactions of the distributed system in a Directed Acyclic Graph (DAG) based on the final ordering of the aggregate queue.

In some implementations, the control unit 145 is a node within a distributed system. For example, the distributed system can be an asynchronous system that includes asynchronous computing nodes. In some cases, a subset of actions can occur asynchronously at computing nodes of the distributed system. An occurrence of the subset of actions can include executing an action either as a transaction or as an action performed by an autonomous vehicle.

Although examples are provided for specific agents, some (or all) of the examples that are described with reference to a particular agent can be performed on any of the agents 105, 110, and 115 as well as additional agents that can be included in the system 100.

Figure 2:
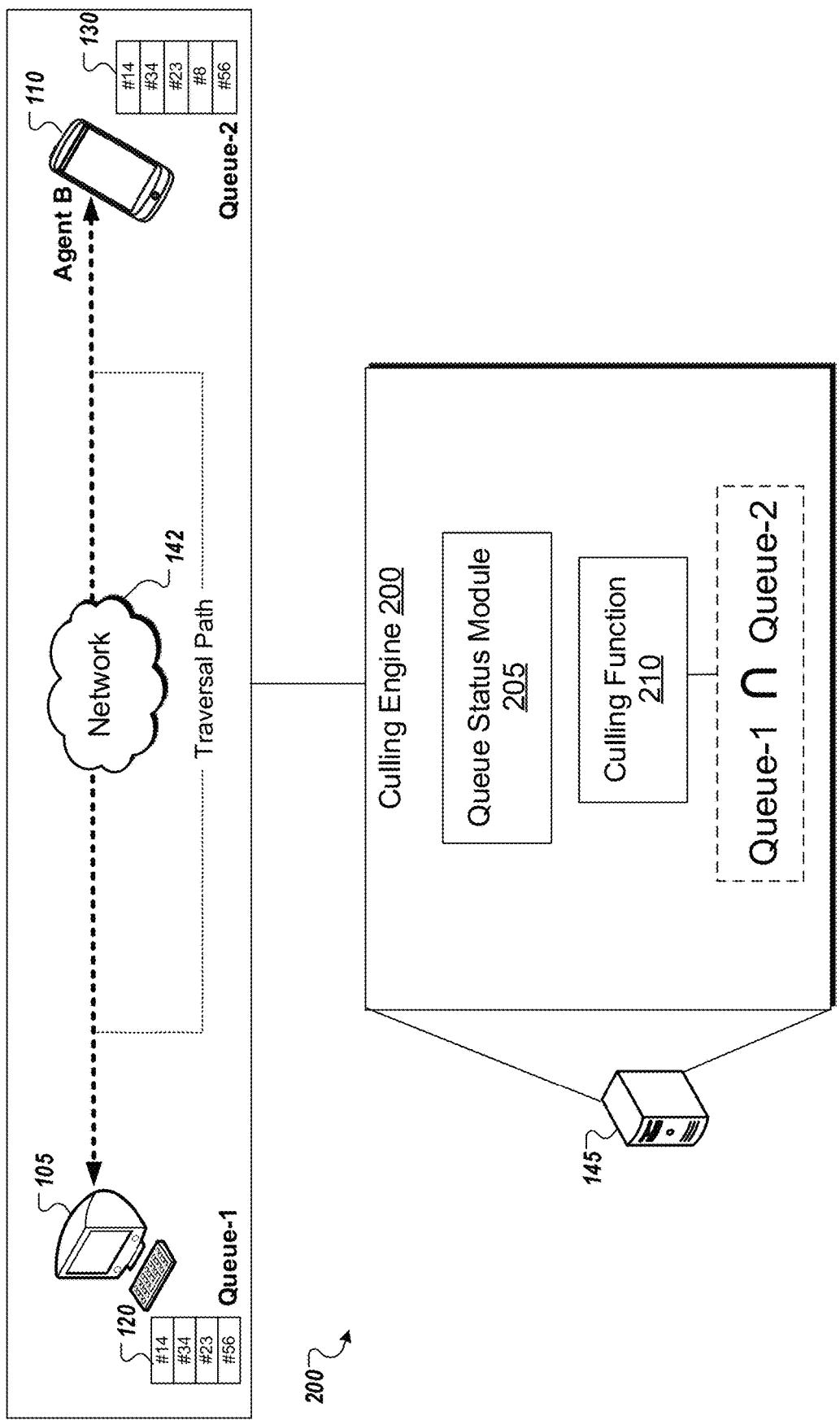
FIG. 2 is a diagram showing an example of a system for culling actions within an action ordering system.

FIG. 2 is a diagram showing an example of a system 200 for culling actions within an action ordering system. The system 200 includes the control unit 145, the network 142, and the agents 105 and 110. Each of the control unit 145, the computer 105, and the smartphone 110 is communicably connected to one another by the network 142.

The control unit 145 includes a culling engine 200, a queue status module 205, and a culling function 210. As discussed in FIG. 1, the control unit 145 can be a node within a distributed network of devices that includes the control unit 145, the computer 105, and the smartphone 110.

The culling engine 200 can include one or more elements of hardware on the control unit 145. The culling engine 200 can perform operations of the queue status module 205 including identifying and determining the actions (or action ordering) of each local queue that is received or obtained from a particular agent. As discussed herein, the queue status module 205 can determine a shortest queue from the one or more obtained queues, including the queues 120 and 130. The queue status module 205 can determine which actions of the queues are included within each queue.

In some implementations, the culling function 210 is used by the culling engine 200 to perform an intersection operation. For example, the culling function 210 can determine, based on the total number of actions in each local queue of the obtained local queues, the actions that are common within each local queue or the actions that are not common within each local queue. The actions that are not common are removed from the local queues before aggregation as described in FIG. 1.

In some implementations, each of the agents, including the agents 105 and 110, share their local queues. That is, each agent within the system, such as the system 100 or the system 200, generates a local queue and obtains local queues from one or more other agents within the system. To take one agent for example, the computer 105 can obtain the queue 130 and also obtain the queue 120 that the computer 105 generated. If other agents are in the system, the computer 105 can obtain local queues from each of the other agents.

The computer 105 can generate a shared queue based on the obtained local queues from other agents in the system as the control unit 145 generates the shared queue 165. That is, the computer 105 can receive the actions, performing a culling operation, aggregate the ranks of the actions in the local queues, and then generate a shared queue based on the ranks of actions in the received queues.

FIG. 3 is a diagram showing an example of a system 300 for ordering actions for autonomous vehicles. The actions of FIG. 3 include directions to move either to a first property 330 or a second property 340. At time T1, the robots 302 of the system 300 determine, based on local processes or instructions received from controllers, positions in which to move. The robots 302, like the agents 105, 110, and 115 of FIG. 1, send their local queues of actions 303a-c. In this example, the robots 302 send the queues of actions 303a-c to control unit 306 of the system 300.

The robots 302 and the control unit 306 are communicably connected by network 304 similar to the network 142 of FIG. 1. The robots 302 send the queues 303a-c to the control unit 306 over the network 304. The robots 302 can communicate with the control unit 306 while in motion or before starting a mission. In some implementations, the control unit 306 is configured on a robot of the robots 302. Although three robots are shown in FIG. 3, the system 300 can include any number of robots.

The control unit 306 obtains the queues 303a-c as a local queue set 310. The local queues can store data as a vector, linked list, among other data formats. The control unit 306 can perform a culling operation on the local queue set 310 as discussed herein. In this case, all actions in each queue of the local queue set 310 are common so no action is removed.

The control unit 306 provides the local queue set 310 to an aggregation function 312. A discussed herein, the aggregation function 312 can assign weights or points to rankings of actions. In some implementations, assigning weights or points includes performing a Borda count or Kemeny median approximations. The control unit 306 can combine the weights or points of each action based on their rank across multiple queues. Based on the combined weight or point total of actions, the control unit 306 can generate a shared queue 314.

The control unit 306 provides the shared queue 314 to the hashing function 316. The hashing function 316 can include typical hashing functions including Secure Hash Algorithm 256 (SHA-256) among others. The hashing function 316 generates a hash value 318 of the shared queue 314 based on one or more hashing algorithms. The control unit 306 packages the hash value 318 into hash data packages 320a-c and sends the packages 320a-c to the robots 302.

In some implementations, the hashing function 316 includes one or more hashing operations. For example, the hashing function 316 can include operations detailed within SHA-2 (e.g., SHA-224, SHA-256, SHA-384, SHA-512, SHA-512/224 and SHA-512/256). The hashing function 316 can include operations within SHA-3 (i.e., SHA3-224, SHA3-256, SHA3-384, SHA3-512, SHAKE128 and SHAKE256). The hashing function 316 can include the four fixed-length SHA-3 algorithms, e.g., SHA3-224, SHA3-256, SHA3-384, and SHA3-512. The SHA-3 Extendable-Output Functions (XOFs), SHAKE128 and SHAKE256, can be specialized to hash functions, subject to additional security considerations.

By referring to the hash value 318 packed in the received packages 320a-c, the robots 302 can determine a consensus within the robots 302. In the example of FIG. 3, the robots are determining whether to navigate to the first property 330 before or after the second property 340. Navigating to the first property 330 can be represented by the action #1 and navigating to the second property 340 can be represented by the action #2.

The robots 302 can determine, based on the received packages 320a-c, the order of navigation. The received packages 320a-c can be configured to cause the robots 302 to navigate to the first property 330 before the second property 340 based on the action #1 being before the action #2 in the shared queue 318 packages in the received packages 320a-c. The robots 302 navigate from a first location at time T1 to the first property 330 at time T2. The robots 302 then navigate to the second property 340 at time T3 after T2.

In some implementations, actions that comprise the local queues are trajectories of one or more addressed robots. For example, each sequential member action of the queue can correspond to a period of time in the future with an associated projected location as well as other parameters, such as velocity, acceleration, among others, for an addressed robot. There may be many addressed robots, and in much the same way as the distributed computing example, conflicts can arise where two or more robots are to occupy the same space at the same time based on each agent's corresponding shared queue. These conflicts can be identified in a similar process as in the commands of distributed computing example and can re-direct the trajectories of the robots by resolving the conflicts in the trajectory orderings as the conflicts are resolved in transaction orderings discussed in regard to FIG. 1. This allows the autonomous agents to agree on each of the other agents' paths to avoid collisions and swarm based on system objectives.

In some implementations, the robots 302 can send the queues 303a-c to one another such that each robot determines a shared queue based on culling functions and rank aggregation as described herein, provides the shared queue or a hash of the shared queue to one another, and then confirms if the received shared queues from other agents matches the shared queue generated. If more than a threshold number of agents within a group of agents determines that the received shared queue is not the same as a generated queue, an error signal can be sent to a controlling device or each agent within the system. Then, shared queues can be re-generated until a threshold number of agents agree that the received shared queues match the generated shared queues.

Figure 4:
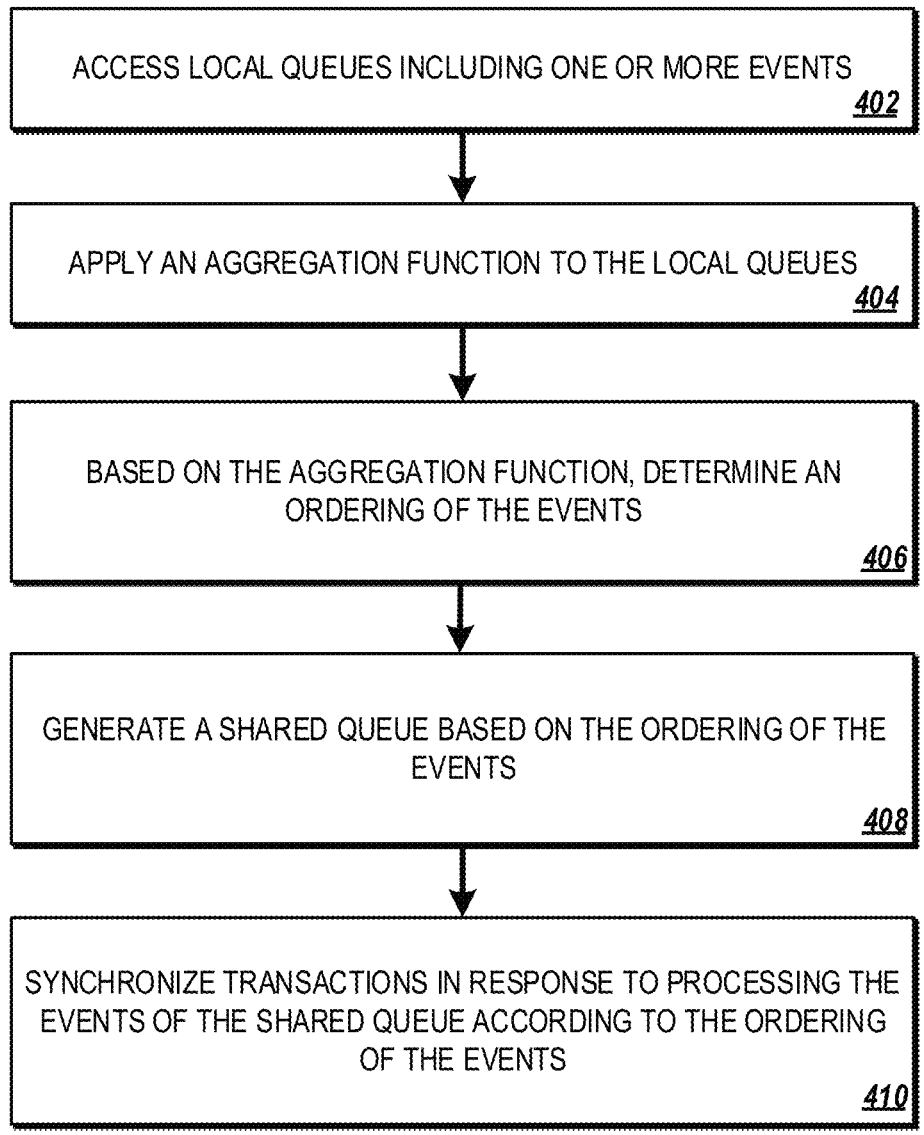
FIG. 4 is a flow diagram illustrating an example of a process for action ordering.

FIG. 4 is a flowchart illustrating an example of a process 500 for action ordering. The process 400 may be performed by one or more electronic systems, for example, the system 100 of FIG. 1, the system 200 of FIG. 2, or the system 300 of FIG. 3.

The process 400 includes accessing local queues including one or more actions (402). For example, the control unit 145 can access the local queues 120, 130, and 140 after the agents 105, 110, and 115 provide the locally generated queues to the control unit 145.

The process 400 includes applying an aggregation function to the local queues (404). For example, the control unit 145 can generate scores or weights for each action in the locally generated queues. The control unit 145 can then combine generated scores or weights for each action based on its ranking in each of the local queues to determine a total score or weight for each action.

The process 400 includes based on the aggregation function, determining an ordering of the actions (406). For example, the control unit 145 can compare the scores or weights for each action to determine which action has a higher or lower score. Based on the relative difference between scores, the control unit 145 can determine where actions should be ordered within the shared queue 165. For example, in some cases higher scores indicate actions that should be ordered before actions with lower scores. In this case, if the control unit 145 generates a score for an action that is higher than a score for another action, the first action can be ordered before the other action.

The process 400 includes generating a shared queue based on the ordering of the actions (408). In some cases, the shared queue 165 indicates a single ordering of actions based on the ordering of actions in each of the culled local queues 120, 130, and 140. For example, the control unit 145 can generate a data structure, such as a vector, linked list, or other applicable structure, according to the determined order of the actions. For example, if scoring is used to determine the order, a first action with a first score ordered before a second action with a second score can be stored within a data structure. In an implementation where the structure is a vector, the first action can correspond to a first index that is lower than a second index corresponding to the second action.

The process 400 includes synchronizing transactions in response to processing the actions of the shared queue according to the ordering of the actions (410). For example, the control unit 145 can add the shared queue 165 to a block in a blockchain ledger. For example, the control unit 145 can generate a block and, after aggregating the local queues obtained from the agents 120, 130, and 140 and generating the shared queue based on a determined ordering, write the shared queue 165 into the block recording the actions and included transactions.

Figure 5:
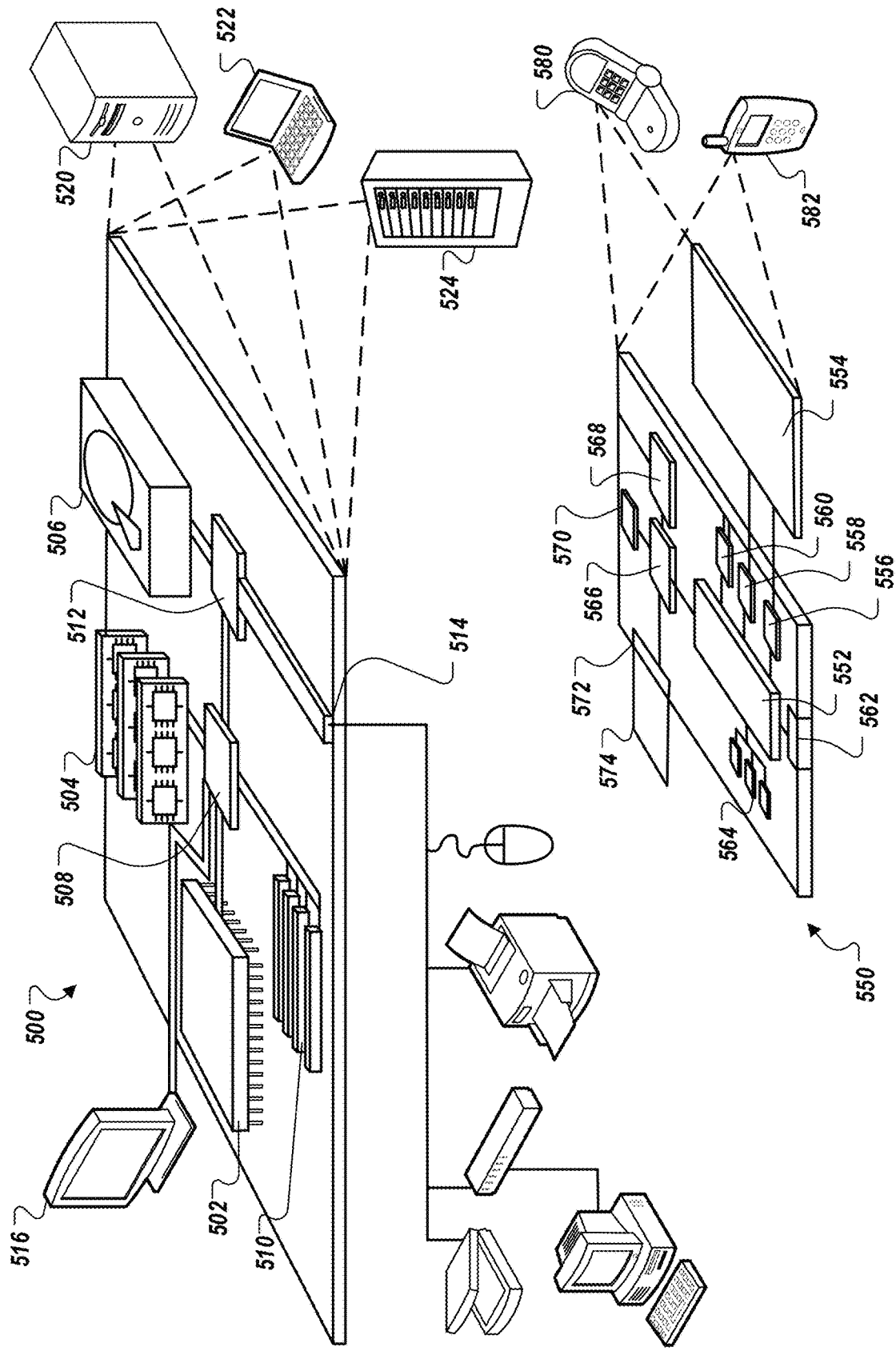
FIG. 5 is a diagram illustrating an example of a computing system used for action ordering.

FIG. 5 is a diagram illustrating an example of a computing system used for action ordering. The computing system includes computing device 500 and a mobile computing device 550 that can be used to implement the techniques described herein. For example, one or more components of the system 100 could be an example of the computing device 500 or the mobile computing device 550, such as a computer system implementing the control unit 145 or the agents 105, 110, and 115, devices that access information from the control unit 145 or the agents 105, 110, and 115, or a server that accesses or stores information regarding the operations performed by the control unit 145 or the agents 105, 110, and 115.

The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 502 is a single threaded processor. In some implementations, the processor 502 is a multi-threaded processor. In some implementations, the processor 502 is a quantum computer.

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine readable mediums (for example, the memory 504, the storage device 506, or memory on the processor 502). The high-speed interface 508 manages bandwidth-intensive operations for the computing device 500, while the low-speed interface 512 manages lower bandwidth-intensive operations. Such allocation of functions is an example only. In some implementations, the high speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may include one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry in some cases. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 568 using a radio frequency. In addition, short-range communication may occur, such as using a Bluetooth, Wi-Fi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, among others) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A computer-implemented method performed by a processing agent of a plurality of agents of a distributed system, the method comprising:
   accessing a plurality of local queues, wherein each local queue of the plurality of local queues comprises one or more actions;
   obtaining a first action sequence from a first local queue of a first agent of the plurality of agents;
   obtaining a second action sequence from a second local queue of a second agent of the plurality of agents;
   identifying at least one action included in one of the first action sequence and the second action sequence but not included in both the first action sequence and the second action sequence;
   removing the at least one action from one of the first action sequence or the second action sequence;
   after removing the at least one action, applying an aggregation function to the plurality of local queues;
   based on the application of the aggregation function, determining an ordering of a plurality of actions comprising the one or more actions of each local queue, wherein the ordering comprises a first action being ordered before a second action;
   generating a shared queue based on the ordering of the plurality of actions, the shared queue comprising the first action at a first position of the shared queue and the second action at a second sequential position of the shared queue;

computing a latency value that measures delay in traversing a distance between two or more agents of the distributed system;
determining a topology of transactions at the distributed system based on: i) action sequences that are generated at the respective local queue of each agent, and ii) the latency value;
generating an aggregate queue from the determined topology of transactions, the aggregate queue comprising a final ordering of the plurality of actions; and
ordering transactions of the distributed system in a Directed Acyclic Graph (DAG) based on the final ordering of the plurality of actions in the aggregate queue.

2. The method of claim 1, comprising:
transmitting a representation of the shared queue to each of the plurality of agents.

3. The method of claim 2, wherein the representation of the shared queue comprises a hash value and wherein the method comprises:
generating the hash value representing the shared queue by applying a hash function to the shared queue.

4. The method of claim 2, comprising:
obtaining a new local queue from the first agent in response to transmitting the representation of the shared queue to the first agent, wherein the new local queue includes at least one action obtained by the first agent not included in the plurality of actions of the shared queue.

5. The method of claim 1, wherein each local queue of the plurality of local queues is generated by one or more agents of the distributed system and the method further comprises:
for each of the one or more agents:
obtaining a local queue generated by the agent based on an ordering of the one or more actions obtained by the agent.

6. The method of claim 1, wherein the aggregation function represents a preferential vote that sequences a respective plurality of actions that are received by each of one or more agents each generating a local queue of the plurality of local queues.

7. The method of claim 1, wherein:
the distributed system is an asynchronous system comprising a plurality of asynchronous computing nodes; and
a subset of the plurality of actions occur asynchronously at computing nodes of the distributed system.

8. The method of claim 1, wherein applying the aggregation function comprises ordering the plurality of actions according to Borda count rules.

9. The method of claim 1, wherein applying the aggregation function comprises performing Kemeny median approximations.

10. The method of claim 1, wherein determining the ordering of the plurality of actions comprises:
determining the ordering of the plurality of actions without reference to a timestamp associated with any of the plurality of actions.

11. The method of claim 1, wherein each of the plurality of agents are located at different geographic locations.

12. The method of claim 1, comprising transmitting a representation of the shared queue to each of the one or more agents, wherein the plurality of actions included in the shared queue are configured to be processed by parallel processing of the one or more agents, and wherein the parallel processing comprises:

processing, using a first processor, an action of the shared queue; and
at least partially during processing of the action, processing, using a second processor different from the first processor, a different action of a second shared queue, wherein (i) the shared queue includes actions that affect a first set of one or more memory addresses and (ii) the second shared queue includes actions that affect a second set of one or more memory addresses different from the first set of one or more memory addresses.

13. The method of claim 1, wherein identifying the at least one action included in one of the first action sequence and the second action sequence but not included in both the first action sequence and the second action sequence comprises:
identifying either the first local queue or the second local queue as a shortest local queue; and
using the shortest local queue, identifying the at least one action included in one of the first action sequence and the second action sequence but not included in both the first action sequence and the second action sequence.

14. A non-transitory computer-readable medium storing one or more instructions executable by a computer system to perform operations comprising:
accessing a plurality of local queues, wherein each local queue of the plurality of local queues comprises one or more actions;
obtaining a first action sequence from a first local queue of a first agent of a plurality of agents;
obtaining a second action sequence from a second local queue of a second agent of the plurality of agents;
identifying at least one action included in one of the first action sequence and the second action sequence but not included in both the first action sequence and the second action sequence;
removing the at least one action from one of the first action sequence or the second action sequence;
after removing the at least one action, applying an aggregation function to the plurality of local queues;
based on the application of the aggregation function, determining an ordering of a plurality of actions comprising the one or more actions of each local queue, wherein the ordering comprises a first action being ordered before a second action;
generating a shared queue based on the ordering of the plurality of actions, the shared queue comprising the first action at a first position of the shared queue and the second action at a second sequential position of the shared queue;
computing a latency value that measures delay in traversing a distance between two or more agents of a distributed system;
determining a topology of transactions at the distributed system based on: i) action sequences that are generated at the respective local queue of each agent, and ii) the latency value;
generating an aggregate queue from the determined topology of transactions, the aggregate queue comprising a final ordering of the plurality of actions; and
ordering transactions of the distributed system in a Directed Acyclic Graph (DAG) based on the final ordering of the plurality of actions in the aggregate queue.

15. The non-transitory computer-readable medium of claim 14, comprising:
transmitting a representation of the shared queue to each of the plurality of agents.

16. The non-transitory computer-readable medium of claim 15, wherein the representation of the shared queue comprises a hash value and wherein the operations comprise:
generating the hash value representing the shared queue by applying a hash function to the shared queue.

17. The non-transitory computer-readable medium of claim 15, comprising:
obtaining a new local queue from the first agent in response to transmitting the representation of the shared queue to the first agent, wherein the new local queue includes at least one action obtained by the first agent not included in the plurality of actions of the shared queue.

18. A system, comprising:
one or more processors; and
machine-readable media interoperably coupled with the one or more processors and storing one or more instructions that, when executed by the one or more processors, perform operations comprising:
accessing a plurality of local queues, wherein each local queue of the plurality of local queues comprises one or more actions;
obtaining a first action sequence from a first local queue of a first agent of a plurality of agents;
obtaining a second action sequence from a second local queue of a second agent of the plurality of agents;
identifying at least one action included in one of the first action sequence and the second action sequence but not included in both the first action sequence and the second action sequence;
removing the at least one action from one of the first action sequence or the second action sequence;
after removing the at least one action, applying an aggregation function to the plurality of local queues;
based on the application of the aggregation function, determining an ordering of a plurality of actions comprising the one or more actions of each local queue, wherein the ordering comprises a first action being ordered before a second action;
generating a shared queue based on the ordering of the plurality of actions, the shared queue comprising the first action at a first position of the shared queue and the second action at a second sequential position of the shared queue;
computing a latency value that measures delay in traversing a distance between two or more agents of a distributed system;
determining a topology of transactions at the distributed system based on: i) action sequences that are generated at the respective local queue of each agent, and ii) the latency value;
generating an aggregate queue from the determined topology of transactions, the aggregate queue comprising a final ordering of the plurality of actions; and
ordering transactions of the distributed system in a Directed Acyclic Graph (DAG) based on the final ordering of the plurality of actions in the aggregate queue.

* * * * *